(12) United States Patent
Park et al.

(10) Patent No.: US 6,171,353 B1
(45) Date of Patent: Jan. 9, 2001

(54) APPARATUS FOR TREATING WASTE GASES

(75) Inventors: Young-bae Park; Hyung-ryul Kim, both of Kyonggi-do (KR)

(73) Assignee: Union Industry Co., Ltd., Kyonggi-do (KR)

(*) Notice: Under 35 U.S.C. 154(b), the term of this patent shall be extended for 0 days.

(21) Appl. No.: 09/072,535

(22) Filed: May 4, 1998

(30) Foreign Application Priority Data

May 26, 1997 (KR) .................................................. 97-20644

(51) Int. Cl.⁷ ............................. B01D 45/18; B01D 35/18
(52) U.S. Cl. ......................... 55/282.2; 55/282.5; 55/295; 422/173
(58) Field of Search ............................... 55/282.2, 282.5, 55/295–297; 422/168, 169, 173, 182, 202

(56) References Cited

U.S. PATENT DOCUMENTS

| | | | |
|---|---|---|---|
| 2,219,996 | * 10/1940 | Livingston | ........................... 55/282.2 |
| 2,521,380 | * 9/1950 | Lichtenfels | ........................... 55/295 X |
| 2,713,921 | * 7/1955 | Turner | ........................... 55/296 |
| 4,608,063 | * 8/1986 | Kurokawa | ........................... 55/282.2 X |
| 5,405,445 | * 4/1995 | Kumada et al. | ........................... 422/173 X |
| 5,800,792 | * 9/1998 | Ibaraki et al. | ........................... 422/173 X |

* cited by examiner

Primary Examiner—Robert Spitzer
(74) Attorney, Agent, or Firm—Dann, Dorfman, Herrell and Skillman; Henry H. SKillman

(57) ABSTRACT

Disclosed is an apparatus for effectively treating waste gases which are discharged during a processing of manufacturing semiconductors. The apparatus for treating waste gases according to an embodiment of the present invention comprises a waste gases heating chamber, a waste gases collecting chamber, a waste gases collecting chamber cover, a scraping device for the waste gases collecting chamber cover, a scraping device for the waste gases collecting chamber, and a driving source for driving the scraping device for the waste gases collecting chamber cover, and the scraping device for the waste gases collecting chamber. The apparatus for treating waste gases further includes a cooling tube which is disposed on an outer surface of the waste gases collecting chamber, for cooling waste gases.

14 Claims, 5 Drawing Sheets

APPARATUS FOR TREATING WASTE GASES

BACKGROUND OF THE INVENTION

1. Field of the Invention

The present invention relates to a closed type of apparatus for treating waste gases, such as poison gases which are discharged during the manufacturing of semiconductor.

2. Description of the Prior Art

In general, amount of gases with poison, combustibility, and causticity are use for a processing of manufacturing semiconductor. Silane, dichloride silane, ammonia, oxidized nitrogen, arsine, phosphine, diboron, boron, and trichloride are used for a process of a chemical vapor deposition. In the processing of manufacturing semiconductors, some of them are used in the processing and the waste gases of them with high density of poison are discharged into ambience.

Also, various of waste gases with poison is created during the processing of a lower pressure chemical vapor deposition, a plasma chemical vapor deposition, a plasma etching, an epitaxy vapor deposition.

The treatment of the waste gases is very important thing relating to the environments. In recent, the law relating to the environments provides that poison must be removed from the waste gases before discharging the waste gases into the ambience.

Various efforts have been tried to treat the waste gases which are discharged during the processing of manufacturing semiconductors, but the apparatus for treating the waste gases cannot achieve a satisfactory performance and effect and have a lot of defection.

FIG. 1 is a perspective view of a wet type of an apparatus for treating waste gases according to an embodiment of the conventional art, which is partially cut.

The wet type of the apparatus for treating waste gases according to the embodiment of the conventional art includes an inlet chamber 220 in which the discharged waste gases and air flow, a heating chamber 204 which is mounted in a lower portion of the inlet chamber 220, for heating a mixture of the waste gases and air, a mixing chamber 208 which is positioned at a lower portion of the heating chamber 204, for mixing water and high temperature of the mixed gases, a waste gases collecting tube 207 which is mounted on the bottom of the mixing chamber 208, and a drain 209 for discharging the collected substrates out of the tube 207.

In the wet type of the apparatus for treating the waste gases, the waste gases pass through an inlet pipe 201 for the waste gases and move to an inlet pipe 202 for air during the processing of collecting poisonous components.

The mixed waste gases are heated by a heating coil 205 installed in a heating chamber. The heating coil is mounted on an inner surface of a wall of the heating chamber. Water is sprayed through a nozzle 206 of an inlet pipe 203 mounted at an upper portion of the mixing chamber 208. Then, the high temperature of the mixing gases reacts with water and the poisonous components are separated into a solid component and liquid component. Thus, gases without poison are discharged through discharging pipe 210 out of the mixing chamber 208 and solid component and liquid component are discharged through the drain 209 out of the mixing chamber 208.

FIG. 2 is a perspective view of a dry type of an apparatus for treating waste gas according to another embodiment of the conventional art.

The dry type of the apparatus for treating waste gases includes a mixing section 303, a combustion chamber 304 which is defined at a lower portion of the mixing section, a drawing chamber 305 which is defined under the combustion chamber 304, a collecting container 308 for collecting a drawn substrate, and a cover 309 which encloses the mixing section 303, the combustion chamber 304, the drawing chamber 305, and the collecting container 308, for absorbing air for cooling therein, for mixing the air and purified gases, and for introducing the mixed gases into a duct.

In the apparatus for treating the waste gases, after the waste gases which are introduced through an inlet pipe 301 into the apparatus, are mixed with fuel in a gas phase such as a liquified natural gas and a liquified propane gas which is introduced through an inlet 302 for fuel in gas phase into the apparatus and are transmitted to the combustion chamber 304, the mixture of the waste gases and the fuel is combusted in the combustion chamber 304 by a combustor (not shown).

At this time, poison component of the waste gases, for example silane, is combusted with oxygen or air to create silicon dioxide particles. The particles are very fine and are moved along the wall of the drawing chamber 305 by a conical guide 306 which is rotated by a motor 311 in the drawing chamber 305 to be collected in the collecting container 308.

The combusted and purified gases 315 are mixed with the cooling air 307 which is introduced through space 316 between the cover 309 and the collecting container 308 and are transmitted through space between the cover and the drawing chamber 313 to a duct 314. Then, the purified gases 315 are filtered in the duct 314 and discharged to outside. A reference numeral 310 which is not described indicates a scraper which makes a dust 312 detached from the inner surface of the drawing chamber 305.

In the dry type of the apparatus for treating the waste gases according to the conventional art, however, the drawn fine particles cause the combuster to have out of order. A combustible gases with explosiveness are used in the apparatus for treating the waste gases. The apparatus for treating the waste gases is an open type and a cooling air is introduced from outside therein. Accordingly, there are disadvantages in that it is difficult to manage the apparatus for treating the waste gases and a consumption of fuel increases in a view of economy.

In the dry type of the apparatus for treating the waste gases, there is another disadvantage in that even if the dust attached on the inner surface of the drawing chamber 313 is removed by the scraper, the dust attached on the inner surface of the cover cannot be removed, thereby a lot of time and persons are needed for removing the dust attached on the inner surface of the cover.

SUMMARY OF THE INVENTION

The present invention has been made to overcome the above described problem of the prior art. It is an object of the present invention to provide an apparatus for treating waste gases in which an explosion of a combustion gases is prevented in such a manner that the waste gases and reaction gases are mixed, thereby heating the mixed gases at a predetermined temperature.

It is another object of the present invention to provide an apparatus for treating waste gases in which fine dusts attached to an inner surface of a waste gases collecting chamber cover and a bottom surface of a lower trap.

To accomplish the above object of the present invention, there is provided an apparatus for treating waste gases comprising:

a waste gases heating chamber for heating the waste gases mixed with air so as to separate a solid phase-reacted product and a gas phase-purified gas;

a waste gases collecting chamber which is connected to the waste gases heating chamber, for collecting the heated and reacted products and the purified gases by condensing and cooling the products and the gases;

a cover of the waste gases collecting chamber which is spaced at predetermined distance from the waste gases collecting chamber and tightly closes the waste gases collecting chamber, for collecting and delivering the rest of the reacted products and the purified gases in the waste gases collecting chamber;

a first scraping device for removing by-products attached to an inner surface of the cover of waste gases collecting chamber;

a second scraping device for removing by-products attached to an inner surface of the waste gases collecting chamber; and a driving source for driving the first scraping device and the second scraping device.

The waste gases collecting chamber includes a first cylindrical body, a chamber flange which is formed at one end of the first body and is combined with the waste gases heating chamber, a second body which has a shape of hopper and is connected to the first body, and a cylindrical screw portion which is connected to the second body and has a screw formed thereon.

The cover of the waste collecting chamber includes a cylindrical cover body which has a gas discharging pipe formed thereon and has a window formed at predetermined position thereof, a cover flange which is formed at one end of the cover body and is combined with the chamber flange, a lower trap which has a hopper shape and is connected to the another end of the cover body and a discharging pipe which is formed at a center of the lower trap.

A cooling tube is mounted on an outer surface of the waste gases collecting chamber.

The scraping device includes a power transferring section for the waste gases collecting chamber which is engaged with the driving source at one end thereof, and a scraper for the waste gases collecting chamber cover which is combined with the power transferring section for the waste gases collecting chamber cover at another end thereof.

The power transferring section includes a first support body which is combined at one end thereof with a lower end of the waste gases collecting chamber and has a connecting projection at another end thereof, and a driven gear of the waste gases collecting chamber cover which is rotatably connected to a peripheral surface of the first support body, for supporting the scraper of the collecting chamber cover.

The driven gear of the waste gases collecting chamber cover includes a spur gear.

The waste gases collecting chamber includes a power transferring section which is connected to the power transferring section of the waste gases collecting chamber cover and meshes with the driving source, and a scraper for the waste gases collecting chamber, which is connected to the power transferring section of the waste gases collecting chamber.

The power transferring device includes a rotatable body which has a gear support portion projected around a peripheral surface at an intermediate portion and is rotatably combined with a first support body of the power transferring section for the waste gases collecting chamber cover by a bolt at one end thereof, a shaft support which is secured on an inner surface of the rotatable body and has a plurality of supporting bars extending in the rotatable body, a second support body which is connected to the projection of the first at one end thereof and has a long nut inside in order to receive the rotatable body, a shaft which is fixed by the bars of the shaft support and has the scraper of the waste gases collecting chamber fixed thereto, and a driven gear of the waste gases collecting chamber which is fixed to a surface of the gear support of the rotatable body and meshes with the driving source.

The driving source includes driving gears which respectively meshes with the driven gear of the waste gases collecting chamber and the driven gear of the waste gases collecting chamber cover, a driving gear shaft for transferring a rotation force to the driving gears, an electric motor for generating the rotation force, and a pair of bevel gears for transferring the rotation from the electric motor to the driving gear shaft. The driving gears respectively includes a spur gear.

The apparatus for treating the waste gases according to the present invention further comprises a scraper for an inner tube which is disposed at one end of the shaft, for removing the by-products attached to a surface of the inner tube of the waste gases heating chamber.

The scraper for the inner tube has a spiral shape.

The apparatus for treating the waste gases according to the present invention further comprises a scraper for a lower trap which is disposed at another end of the shaft, for removing by-products attached to a bottom surface of the lower trap of the waste gases collecting chamber cover.

BRIEF DESCRIPTION OF THE DRAWINGS

The above object and other advantages of the present invention will become more apparent by describing in detail the preferred embodiment thereof with reference to the attached drawings, in which.

DETAILED DESCRIPTION OF THE PREFERRED EMBODIMENTS

Hereinafter, a preferred embodiment of the present invention will be described in detail with reference to the accompanying drawings.

Figure 1:
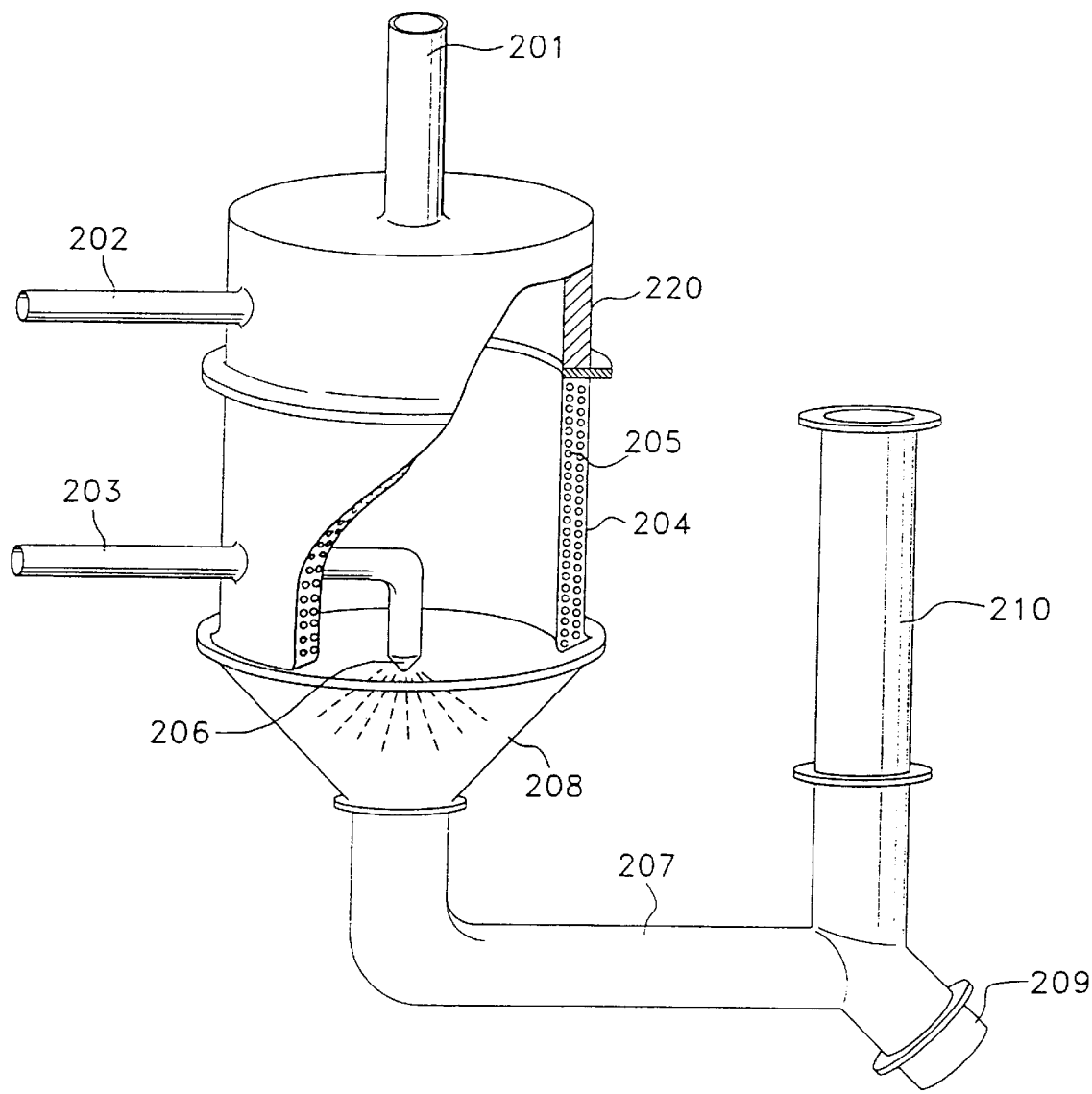
FIG. 1 is a perspective view of a wet type of an apparatus for treating waste gases according to an embodiment of the conventional art, which is partially cut.
Figure 2:
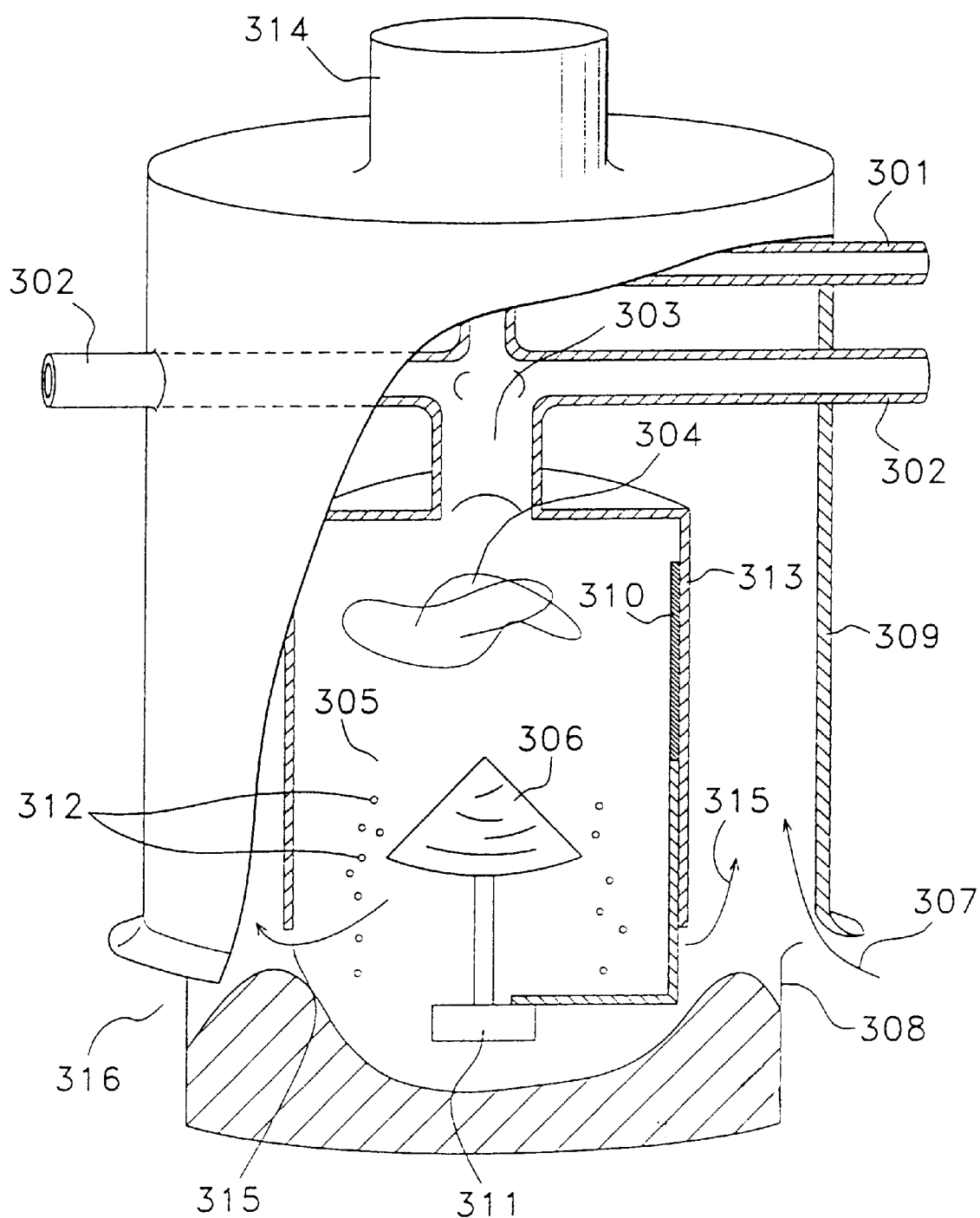
FIG. 2 is a perspective view of a dry type of an apparatus for treating waste gases according to an other embodiment of the conventional art.
Figure 3:
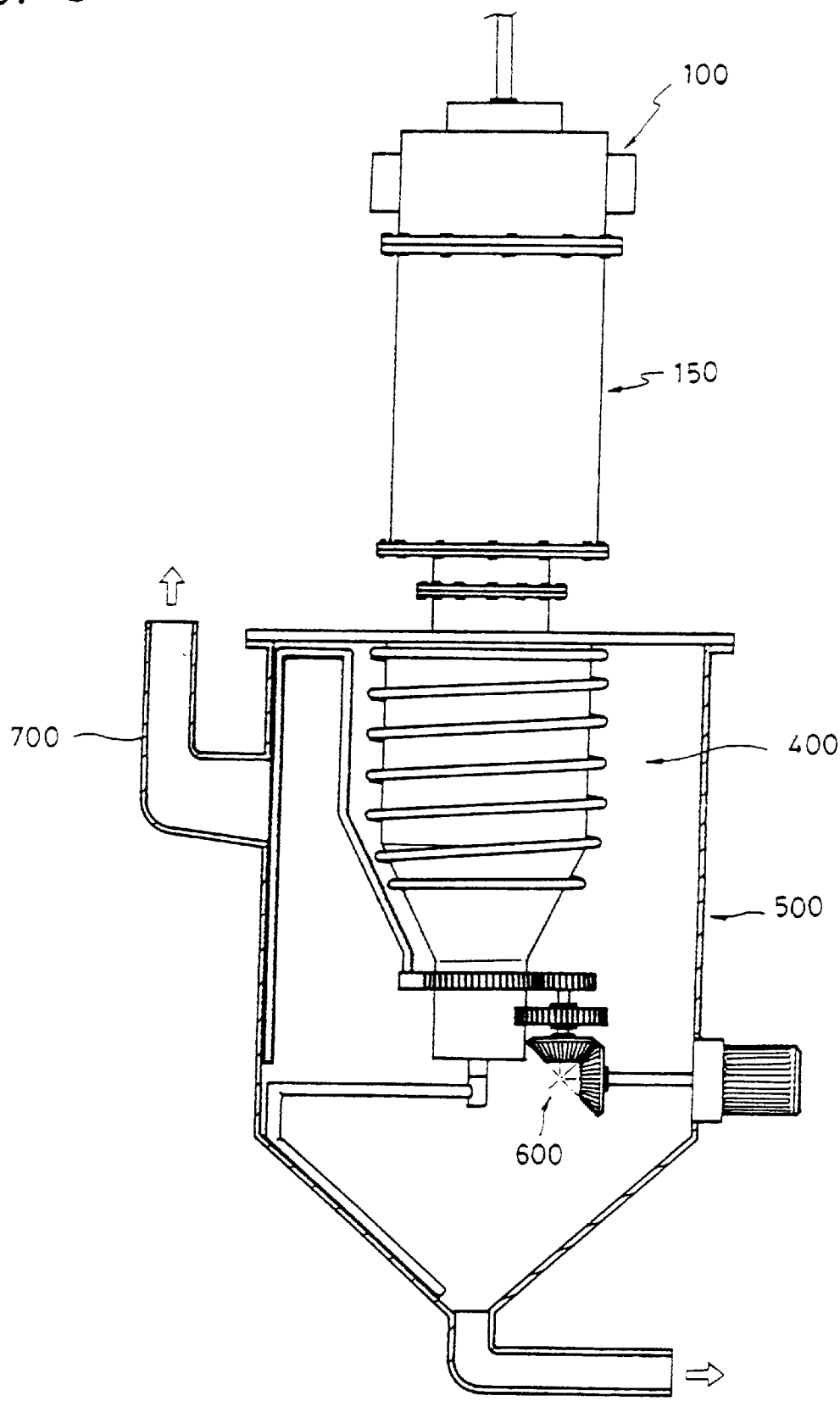
FIG. 3 is a sectional view of an apparatus for treating waste gases according to an embodiment of the present invention.

FIG. 3 is a sectional view of an apparatus for treating waste gases according to an embodiment of the present invention. As shown in FIG. 3, the apparatus for treating waste gases according to the embodiment of the present invention includes a head 100 having an inlet through which waste gases, inactive gases, and reaction air flow, a heating chamber 150 in which mixture of the waste gases, nitrogen as one of the inactive gases, and the reaction air is heated, a by-products collecting chamber 400 in which secondary by-products attached thereto are removed in such a manner that solid-state secondary by-products which are created by oxidizing reaction while the mixture passes through the waste gases heating chamber 150 are condensed and collected, a waste gases collecting chamber cover 500 for introducing the rest of secondary by-products which is not collected in the waste gases collecting chamber into a dust collecting chamber (not shown) and preventing a leakage of poison gases, and a filtering chamber (not shown) for separating and collecting the secondary by-products which is not collected in the dust collecting chamber.

In the waste gases heating chamber 150 of the apparatus for treating waste gases, the head 100 having the inlet is connected to the inner tube (not shown) at one end thereof which in turn the inner tube (not shown) is inserted into an outer tube (not shown) having larger in diameter than the inner tube. A heater (not shown) is mounted in a space between the inner tube and the outer tube, which heats inside of the inner tube at a predetermined temperature. Another end of the inner tube of the waste gases heating chamber 150 is connected to the waste gases collecting chamber 400 by a connecting flange.

Figure 4:
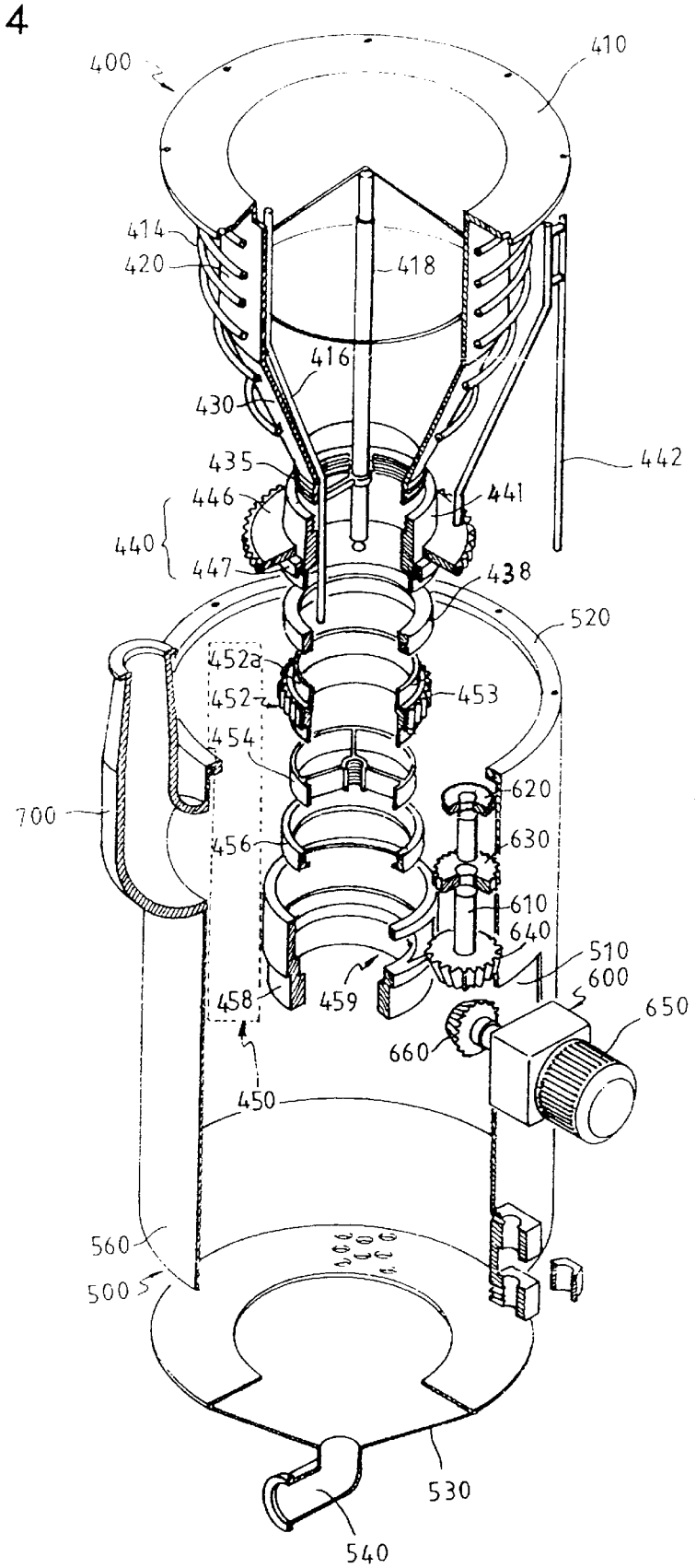
FIG. 4 is an exploded perspective view of the apparatus for treating waste gases according to the embodiment of the present invention.
Figure 5:
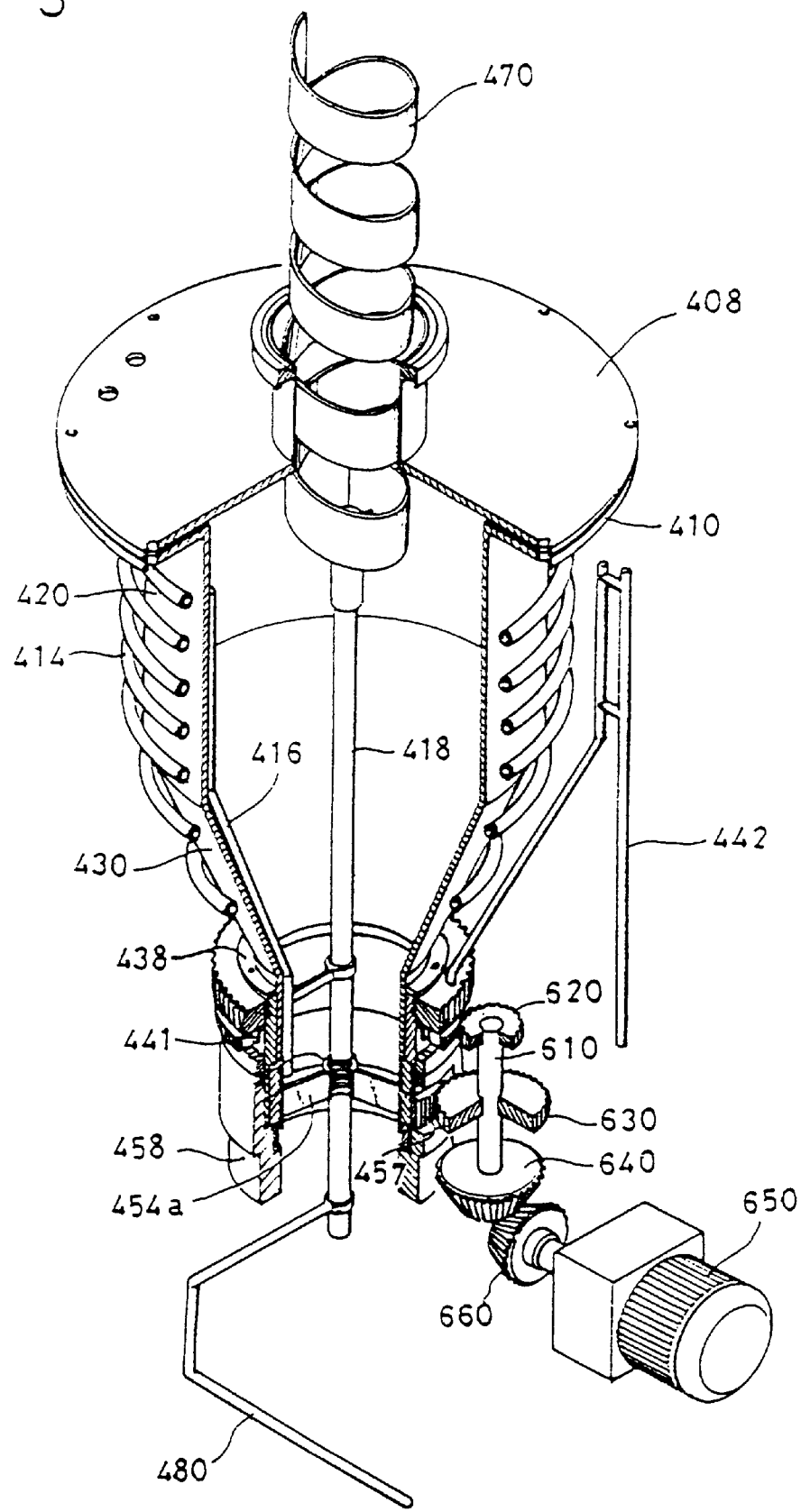
FIG. 5 is a partially cut perspective view of a waste gases collecting chamber and a scraping device in the apparatus for treating waste gases according to the embodiment of the present invention.

FIG. 4 is an exploded perspective view of the apparatus for treating waste gases according to the embodiment of the present invention; and FIG. 5 is a partially cut perspective view of a waste gases collecting chamber and a scraping device in the apparatus for treating waste gases according to the embodiment of the present invention.

As shown in FIGS. 4 and 5, the waste gases collecting chamber 400 on which the secondary by-products includes a cylindrical first body 420, a chamber flange 410 formed at one end of the first body 420, a second body 430 having a hoper shape and connected to the first body 420, and a chamber screw section 435 connected to the second body 430. The chamber screw section 435 is a cylindrical shape and has a screw formed on a peripheral surface. The first body 420 has a larger diameter than that of a third body 435 and is connected to the third body 435. The diameter of the connecting section is gradually reduced from the first body 420 to the second body 430. An upper cover 408 is disposed on the chamber flange 410. The waste gases heating chamber 150 is combined with the chamber flange 410 and the upper cover 408. On the other hand, a cooling tube 414 is wound around the outer surfaces of the first body 420 and the second body 430 of the waste gases collecting chamber 400 in spiral to cool the mixture of the secondary by-products and purified gases which are created in the waste gases heating chamber 150 and is introduced into the waste gases collecting chamber 400.

The waste gases collecting cover 500 includes a cylindrical cover body 560, a cover flange 520 which is formed at one end of the cover body 560 and is combined with the chamber flange 410 of the waste gases collecting chamber 400, a lower trap 530 having a hoper shape, which is connected to the other end of the cover body 560, and a dust discharging pipe 540 which is associated with the lower trap 530. A gas discharging pipe 700 extends from the cover body 560 as to discharge the mixture of the secondary by-products and the purified gases. Also, a window 510 is formed on the cover body 560, through which a rotary shaft of an electric motor 510 extends. The cover body 560 is made in such a manner that when the waste gases collecting chamber 400 is disposed in the cover body 560, a predetermined space is formed between the cover body 560 and the first body 420 of the waste gases collecting chamber 400.

According to the embodiment of the present invention, a scraping device for the waste gases collecting chamber which removes secondary by-products attached to the first and second body 420 and 430 and the inner surface of the connecting screw section 435 is disposed in the waste gases collecting chamber 400. A scraping for the waste gases collecting chamber cover 500 which removes secondary by-products attached to the inner surface of the cover body 560 of the waste gases collecting chamber cover 500 and a scraping device for the lower trap which removes secondary by-products attached to the bottom surface of the lower trap 530 are disposed in the waste gases collecting chamber cover 500.

Referring to FIGS. 4 and 5, the scraping device for the waste gases collecting chamber cover includes a scraper 442 for the waste gases collecting chamber cover which is in contact to the inner surface of the cover body 560 and a power transferring section for the scraper of the waste gases collecting chamber cover which transfers a rotation force from a driving source 600 to the scraper 442. The power transferring section 440 includes a first annular support body 441 having a screw on the inner surface of one end thereof to combine with a connecting screw section 435 of the waste gases collecting chamber 400 and a connecting projection 447 extending externally from the other end thereof, and a spur gear 442 for the scraper of the waste gases collecting chamber cover, which is rotatably disposed on a peripheral surface of the first support body 441 and meshes with the driving section 600 supporting the scraper 442 for the waste gases collecting chamber cover. Preferably, the scraper 442 for the waste gases collecting chamber cover has the same shape as a sectional profile of the inner surface of the waste gases collecting chamber cover 500.

A scraping device for the waste gases collecting chamber includes a chamber scraper 416 which make in contact with a first body 420, a second body 430, and the inner surface of a connecting screw 435, and a power transferring section 450 of the chamber scraper for transferring a rotation force. The power transferring section 450 includes a rotary body 452 which has a gear support 452a formed peripherally at intermediate portion of a peripheral surface thereof and has a driven gear 453 for an annular chamber scraper mounted thereon, which is rotatably combined with the first support body 441 of the power transferring section 440 for the scraper of the waste gases collecting chamber cover, a shaft support having a plurality of supporting bars 454a (FIG. 5) which is fixed on the inner surface of the rotary body and extends in the rotary shaft, a second support body 458 which receives the first support body 441 and is fixed to the connecting projection 447 of the first body 441 at one end thereof, a long shaft 418 which is supported by a plurality of supporting bars of the shaft support 454 and has a scraper 416 for the waste gases collecting chamber cover fixed thereto. A gear window 459 is formed in the second support body 458 to be engaged with a gear. Also, a trap scraper 480 is fixed to a lower end of the long shaft 418 as to remove the secondary by-products attached to the bottom surface of the lower trap 530. A scraper for the inner tube, which makes in contact with the inner surface in a form of a thin strip with winding in a spiral, is formed at the upper end of the long shaft as to remove the secondary by-products attached to the inner surface of the inner tube of the waste gases heating chamber 150.

In the case, a lubricant agency is disposed between the rotatable bodies and the unrotatable body so that the rotary bodies can rotate smoothly.

On the other hand, the driving section 600 includes an electric motor 650, a driving bevel gear 660 mounted on one end of a shaft of the electric motor 650, a driven bevel gear 640 which meshes with the driving bevel gear 660, a gear shaft 610 combined with the driven bevel gear 640, a first driving spur gear 620 which is mounted on the gear shaft 610 and meshes with a spur gear 446 for the scraper of the waste gases collecting chamber cover, and a second driving spur gear 620 which is mounted on the gear shaft and meshes with a driven gear 453 for a scraper of the waste gases collecting chamber cover.

Hereinafter, the operation of the apparatus for treating the waste gases according to the present invention will be described.

First, after the waste gases with poison which is discharged from a discharger of an apparatus for manufacturing semiconductors, is mixed with various gases, the waste gases are introduced into the inner tube of the waste gases heating chamber 150 heated by a predetermined temperature. At this time, the waste gases react to high temperature of the air in the inner tube and is oxidized so as to be separated into a secondary by-products in solid-state and a purified gas.

After the high temperature of the mixture is introduced into the waste gases collecting chamber 400 disposed in the waste gases collecting chamber cover 500, the mixture is subjected to have the rapidly decreasing of temperature due to the cooling tube 414 wound around the waste gases collecting chamber 400 so that the secondary by-products are condensed and grows to be attached to the inner surface of the inner tube of the waste gases heating chamber 150, the inner surface of the waste gases collecting chamber 400, and the inner surface of the waste gases collecting chamber cover 500.

The secondary by-products which are attached to the inner surface of the inner tube of the waste gases heating chamber 150, the inner surface of the waste gases collecting chamber 400, and the bottom surface of the lower trap 530 are removed by the inner tube scraper 470, the chamber scraper 416, and the trap scraper 480. When the electricity is applied to the electric motor to rotate, rotation force is transmitted through the driving bevel gear 660, the driven bevel gear 640, the gear shaft 610, the second driving spur gear 630, the driven gear 453 for the chamber scraper, and the long shaft 418 to the inner tub scraper 470 mounted at an upper end of the long shaft 418, the chamber scraper 416 mounted at an intermediate portion of the long shaft 418, and the trap scraper 480 mounted at a lower end of the long shaft 418. The inner tube scraper 470 of the thin strip makes contact with the inner surface of the inner tube while being wound in spiral. The chamber scraper 416 has the same shape as the sectional profile of the body of the waste gases collecting chamber 400 and makes in contact with the inner surface of the body. The trap scraper 480 makes contact with the inner surface of the trap having a hoper shape to remove the secondary by-products.

The scraper 442 for the waste gases collecting chamber cover removes the secondary by-products attached to the inner surface of the waste gases collecting chamber cover 500. When the electricity is applied to the electric motor to rotate, the rotation force is transmitted to the scraper 442 for the waste gas collecting chamber cover through the driving bevel gear 660, the driven bevel gear 640, the gear shaft 610, the first driving spur gear 630, and the spur gear 445 for the scraper of the waste gases collecting chamber cover so as to rotate the scraper 442. The scraper 442 for the waste gases collecting chamber cover makes contact with the inner surface of the body of the waste gases collecting chamber cover 500 and extends over the bevel gear 640 and 660, as shown in FIG. 3. Also, the inner surface of the body of the waste gases collecting chamber cover makes contact with the trap scraper 480.

The secondary by-products are scraped and removed by the inner tube scraper 470, the scraper 416 for the waste gases collecting chamber, the scraper 442 for the waste gases collecting chamber cover, and then moves down in the direction of gravity. The secondary by-products on the lower trap 530 are removed by the trap scraper 480 and is transferred to a dust collecting pocket (not shown). Also, secondary fine by-products and the purified gases in the states of mixture are transmitted through the gas discharging pipe 700 to a dust collecting apparatus (not shown). The dust collecting apparatus includes a filter for physically filtering particles of the secondary by-products according to a size of them, and a separator for separating the secondary by-products into the particles and the purified gases using a centrifugal force.

The apparatus for treating the waste gases according to the present invention can prevent the collected fine particles from causing the combustor to be out of order. Also, there is an advantage in that since it is not needed for introducing cooling air from outside into the chamber, the apparatus for treating the waste gases can be made in a closed type and can be easy to be managed.

Further, there are other advantages in that it is not needed for many time and persons to manage the apparatus for treating the waste gases, because of removing the secondary by-products attached to the inner surface of the chamber cover and the inner surface of the trap, the blockade of various pipes due to the secondary by-products can be prevented, and an explosion can be prevented by using fireproof gases.

While the present invention has been particularly shown and described with reference to a particular embodiment thereof, it will be understood by those skilled in the art that various changes in form and detail may be effected therein without departing from the spirit and scope of the invention as defined by the appended claims.

What is claimed is:

1. An apparatus for treating waste gases comprising:
    a waste gases heating chamber for heating the waste gases mixed with air so as to separate solid phase-reacted products and gas phase-purified gases;
    a waste gases collecting chamber which is connected to said waste gases heating chamber, for collecting and separating at least one portion of said phase-reacted products and said phase-purified gases by condensing and cooling;
    a collecting chamber cover spaced at predetermined distance from said waste gases collecting chamber and tightly closing said waste gases collecting chamber, for collecting and delivering any remaining portion the phase-reacted products and the phase-purified gases in said waste gases collecting chamber;
    a first scraping device for removing said one portion of phase-reacted products attached to an inner surface of said waste gases collecting chamber cover;
    a second scraping device for removing any phase-reacted products attached to an inner surface of said waste gases collecting chamber; and
    a driving source for driving said first scraping device and said second scraping device.

2. An apparatus for treating waste gases as claimed in claim 1, wherein said waste gases collecting chamber includes a first cylindrical body, a chamber flange formed at one end of said first body and connected to said waste gases heating chamber, a second body with a shape of a hopper connected to said first body, and a cylindrical screw portion connected to said second body and having a screw formed thereon.

3. An apparatus for treating waste gas as claimed in claim 2, said collecting chamber cover including a cylindrical cover body having a discharge pipe and a window formed at predetermined positions thereon, a cover flange at one end of said cover body and is connected to said collecting chamber cover, a lower trap of a hopper shape and connected to the other end of said cover body, and a discharging pipe in the center of said lower trap.

4. An apparatus for treating waste gases as claimed in claim 3, including a cooling tube mounted on an outer surface of said waste gases collecting chamber.

5. An apparatus for treating waste gases as claimed in claim 1, wherein said first scraping device includes a power transferring section for said waste gases collecting chamber, said section having one end engaged with said driving source, and having a scraper for said waste gases collecting chamber cover at an end thereof.

6. An apparatus for treating waste gases as claimed in claim 5, wherein said power transferring section includes a first support body connected at one end thereof with a lower end of said waste gases collecting chamber and having a connecting projection at the other end thereof, said waste gases collecting chamber cover having a driven gear rotatably connected to a peripheral surface of said first support body, for supporting said scraper of said waste gases collecting chamber cover.

7. An apparatus for treating waste gases as claimed in claim 6, wherein said driven gear of said waste gases collecting chamber cover includes a spur gear.

8. An apparatus for treating waste gases claimed in claim 5, wherein said scraping device of said waste gases collecting chamber includes a power transferring section connected to said power transferring section of said waste gases collecting chamber cover and with said driving source, and a scraper for said waste gases collecting chamber connected to said power transferring section of said waste gases collecting chamber.

9. An apparatus for treating waste gases as claimed in claim 8, wherein said power transferring section includes a rotatable body with a gear support portion extending around a peripheral surface at an intermediate portion and rotatably connected to said power transferring section for said waste gases collecting chamber cover, a shaft support secured on an inner surface of said rotatable body and having a plurality of supporting bars extending along said rotatable body, a second support body connected to said projection of said first support body at said other end thereof and having a long nut inside in order to receive said rotatable body, a shaft fixed by said bars of said shaft support, said scraper of said waste gases collecting chamber being fixed to said shaft, and a driven gear for said waste gases collecting chamber, said gear being fixed to said rotatable body and coupled to said driving source.

10. An apparatus for treating waste gases as claimed in claim 9, wherein said driving source includes driving gears which respectively couple with said driven gear of said waste gases collecting chamber and said driven gear of said waste gases collecting chamber cover, a driving gear shaft for transferring a rotation force to said driving gears, an electric motor for generating said rotation force, and a pair of bevel gears for transferring said rotation force from said electric motor to said driving gear shaft.

11. An apparatus for treating waste gases as claimed in claim 10, wherein said driving gears respectively includes a spur gear.

12. An apparatus for treating waste gases as claimed in claim 9, further comprising an inner tube disposed adjacent one end of said shaft connecting with said heating chamber, and a scraper for removing any phase-reacted products attached to a surface of said inner tube of said waste gases heating chamber.

13. An apparatus for treating waste gases as claimed in claim 12, wherein said scraper for said inner tube has a spiral shape.

14. An apparatus for treating waste gases as claimed in claim 12, further comprising a lower trap mounted on said collecting chamber cover adjacent the other end of said shaft, and a trap scraper for removing any phase-reacted products attached to said lower trap of said waste gases collecting chamber cover.

* * * * *